United States Patent
Lauder

(10) Patent No.: US 10,407,166 B2
(45) Date of Patent: Sep. 10, 2019

(54) YAW MOMENT SUPPLEMENT FOR DIRECTIONAL CONTROL

(71) Applicant: Sikorsky Aircraft Corporation, Stratford, CT (US)

(72) Inventor: Timothy F. Lauder, Oxford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/864,702

(22) Filed: Jan. 8, 2018

(65) Prior Publication Data
US 2019/0210717 A1    Jul. 11, 2019

(51) Int. Cl.
| B64C 27/14 | (2006.01) |
| B64C 27/32 | (2006.01) |
| H02K 7/14 | (2006.01) |
| B64D 35/02 | (2006.01) |
| B64C 27/10 | (2006.01) |

(52) U.S. Cl.
CPC .............. *B64C 27/14* (2013.01); *B64C 27/10* (2013.01); *B64C 27/32* (2013.01); *B64D 35/02* (2013.01); *H02K 7/14* (2013.01)

(58) Field of Classification Search
CPC ........ H02K 1/02; H02K 15/03; H02K 7/1807; H02K 11/33; H02K 7/18; H02K 7/1823; H02K 7/14; B64C 27/10; B64C 27/06; B64C 27/14; B64D 2013/0544
See application file for complete search history.

(56) References Cited

U.S. PATENT DOCUMENTS

| 1,936,542 | A | | 11/1933 | Nardone |
| 3,362,255 | A | | 1/1968 | De Rocca et al. |
| 4,558,770 | A | | 12/1985 | Woodruff |
| 4,690,390 | A | | 9/1987 | Kish |
| 4,899,957 | A | | 2/1990 | Eickmann |
| 4,938,333 | A | | 7/1990 | Kish |
| 5,188,511 | A | * | 2/1993 | Ebert ................. B64C 27/82 |
| | | | | 244/17.19 |

(Continued)

FOREIGN PATENT DOCUMENTS

| CN | 1857965 A | 11/2006 |
| CN | 101244762 A | 8/2008 |

(Continued)

OTHER PUBLICATIONS

Timothy Fred Lauder, U.S. Appl. No. 62/244,361, filed Oct. 21, 2015; Provisional Application Titled: Electric Propulsion System for a Rotary Wing Aircraft.

(Continued)

*Primary Examiner* — Thai T Dinh
(74) *Attorney, Agent, or Firm* — Cantor Colburn LLP

(57) ABSTRACT

A rotor system of an aircraft includes a rotor hub rotatable about an axis of rotation, and a power generation system. The power generation system includes a generator stator and a generator rotor. The generator rotor is coupled to the rotor hub. At least one induction type magnet is mounted to at least one of the generator stator and the generator rotor. A control unit is operably coupled to the at least one induction type magnet to selectively deliver power to the at least one induction type magnet to alter a torque of the rotor hub without decreasing a rotational speed of the rotor hub.

20 Claims, 11 Drawing Sheets

(56) References Cited

U.S. PATENT DOCUMENTS

| | | | |
|---|---|---|---|
| 5,271,295 A | 12/1993 | Marnot | |
| 5,749,449 A | 5/1998 | Kearney et al. | |
| 6,484,967 B2 | 11/2002 | Protte | |
| 6,823,972 B2 | 11/2004 | Gmirya | |
| 7,083,142 B2* | 8/2006 | Scott | B64C 27/10 244/17.13 |
| 7,229,251 B2* | 6/2007 | Bertolotti | B64C 1/00 416/128 |
| 7,621,480 B2* | 11/2009 | Darrow, Jr. | B64C 1/00 244/130 |
| 8,181,902 B2 | 5/2012 | Schlunke | |
| 8,235,324 B1* | 8/2012 | Birch | B64C 27/68 244/17.25 |
| 8,531,072 B2 | 9/2013 | Wishart | |
| 8,628,042 B2 | 1/2014 | Imbert et al. | |
| 8,844,880 B1 | 9/2014 | Corliss | |
| 8,851,415 B1 | 10/2014 | Lugg | |
| 8,931,732 B2 | 1/2015 | Sirohi et al. | |
| 8,948,928 B2 | 2/2015 | Alber et al. | |
| 9,004,395 B2 | 4/2015 | Botti | |
| 9,272,779 B2 | 3/2016 | Groenewald et al. | |
| 9,446,842 B2 | 9/2016 | Luyks | |
| 9,584,000 B2* | 2/2017 | Ruan | H02K 26/00 |
| 9,725,179 B2* | 8/2017 | Aubert | H02K 7/116 |
| 9,828,089 B2 | 11/2017 | Lauder et al. | |
| 10,053,207 B2* | 8/2018 | Cox | B64C 7/00 |
| 2009/0140095 A1 | 6/2009 | Sirohi et al. | |
| 2010/0209242 A1 | 8/2010 | Popelka et al. | |
| 2011/0015034 A1 | 1/2011 | Ehinger et al. | |
| 2013/0126669 A1 | 5/2013 | Hamann et al. | |
| 2013/0170985 A1 | 7/2013 | Altmikus et al. | |
| 2015/0093272 A1 | 4/2015 | Komer et al. | |
| 2017/0040870 A1 | 2/2017 | Ballauf | |
| 2017/0167317 A1 | 6/2017 | Lee et al. | |
| 2017/0253328 A1* | 9/2017 | Wang | B64C 27/68 |
| 2017/0297689 A1 | 10/2017 | Lauder et al. | |
| 2019/0023383 A1 | 1/2019 | Lauder | |
| 2019/0023384 A1 | 1/2019 | Lauder | |

FOREIGN PATENT DOCUMENTS

| | | |
|---|---|---|
| GB | 2360752 | 10/2001 |
| JP | 4742390 B2 | 8/2011 |
| JP | 2014149075 A | 8/2014 |
| WO | 2005100154 A1 | 10/2005 |
| WO | 2016128330 A1 | 8/2016 |

OTHER PUBLICATIONS

Timothy Fred Lauder, U.S. Appl. No. 15/010,970, filed Jan. 29, 2016; Non-Provisional Application Titled: Rotor Drive Systems for Rotorcraft.

Timothy Fred Lauder, U.S. Appl. No. 15/295,258, filed Oct. 17, 2016; Non-Provisional Application Titled: Electric Propulsion System for a Rotary Wing Aircraft.

Timothy Fred Lauder, U.S. Appl. No. 15/296,625, filed Oct. 18, 2016; Non-Provisional Application Titled: Electric Propulsion System for a Rotary Wing Aircraft.

Timothy Fred Lauder, U.S. Appl. No. 15/434,951, filed Feb. 16, 2017; Non-Provisional Application Titled: Electric Propulsion System With Overrunning Clutch for a Rotary-Wing Aircraft.

* cited by examiner

YAW MOMENT SUPPLEMENT FOR DIRECTIONAL CONTROL

BACKGROUND

The present disclosure relates to a rotary wing aircraft, and more particularly, to a rotary wing aircraft having a direct drive electric propulsion system.

Rotor blades of rotary-wing aircraft, such as co-axial rotor helicopters, typically create lift from a down-flow of air from above. During normal powered flight operations differential collective is used to provide a yawing moment in an expected direction. When the rotor is in an autorotative state, however, an up-flow of air is provided to the rotor, and the ability to generate torque, and therefore yawing moment by differential collective, and control of the aircraft is degraded. As a result, additional means of yaw control are typically provided in such aircraft. These means may include thrusters and/or a large rudder located at the back end of the helicopters. These additional means of yaw control increase cost, weight and complexity of the aircraft.

BRIEF DESCRIPTION

According to an embodiment, a rotor system of an aircraft includes a rotor hub rotatable about an axis of rotation, and a power generation system. The power generation system includes a generator stator and a generator rotor. The generator rotor is coupled to the rotor hub. At least one induction type magnet is mounted to at least one of the generator stator and the generator rotor. A control unit is operably coupled to the at least one induction type magnet to selectively deliver power to the at least one induction type magnet to alter a torque of the rotor hub without decreasing a rotational speed of the rotor hub.

In addition to one or more of the features described above, or as an alternative, in further embodiments the power generation system is driven by the rotor hub in a first mode of operation and the rotor hub is driven at least partly by the power generation system in a second mode of operation.

In addition to one or more of the features described above, or as an alternative, in further embodiments the power generation system further comprises an energy storage device operably coupled to the at least one induction type magnet, and in the first mode, power is stored within the energy storage device.

In addition to one or more of the features described above, or as an alternative, in further embodiments in the first mode, power is not provided to the at least one induction type magnet.

In addition to one or more of the features described above, or as an alternative, in further embodiments in the second mode of operation, the control unit selectively delivers power from the energy storage device to the at least one induction type magnet to control the torque of the rotor hub.

In addition to one or more of the features described above, or as an alternative, in further embodiments in the second mode of operation, the aircraft is in autorotation.

In addition to one or more of the features described above, or as an alternative, in further embodiments control of the torque of the rotor hub provides yaw control to the aircraft.

In addition to one or more of the features described above, or as an alternative, in further embodiments the rotor system is one of a plurality of rotor systems of the aircraft.

In addition to one or more of the features described above, or as an alternative, in further embodiments the rotor system is one of an upper rotor system and a lower rotor system of a coaxial main rotor system.

In addition to one or more of the features described above, or as an alternative, in further embodiments the aircraft is a distributed propulsion aircraft.

In addition to one or more of the features described above, or as an alternative, in further embodiments the power generation system is disposed adjacent an outboard end of the rotor hub.

According to another embodiment, a method of operating an aircraft includes rotating a rotor system of the aircraft about an axis of rotation, applying power, via a control unit, to at least one induction type magnet of a power generation system coupled to the rotor system, and adjusting a torque of the rotor hub without decreasing a rotational speed of the rotor hub.

In addition to one or more of the features described above, or as an alternative, in further embodiments adjusting the torque of the rotor hub provides directional control to the aircraft.

In addition to one or more of the features described above, or as an alternative, in further embodiments the directional control includes yaw control.

In addition to one or more of the features described above, or as an alternative, in further embodiments applying power through the control unit to at least one induction type magnet further comprises modulating the power applied to the at least one induction type magnet.

In addition to one or more of the features described above, or as an alternative, in further embodiments adjusting the torque of the rotor hub comprises increasing the torque of the rotor hub.

In addition to one or more of the features described above, or as an alternative, in further embodiments adjusting the torque of the rotor hub comprises decreasing the torque of the rotor hub.

In addition to one or more of the features described above, or as an alternative, in further embodiments the rotor system is one of a plurality of rotor systems of the aircraft.

In addition to one or more of the features described above, or as an alternative, in further embodiments the rotor system is one of an upper rotor system and a lower rotor system of a coaxial main rotor system.

In addition to one or more of the features described above, or as an alternative, in further embodiments the aircraft is a distributed propulsion aircraft.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
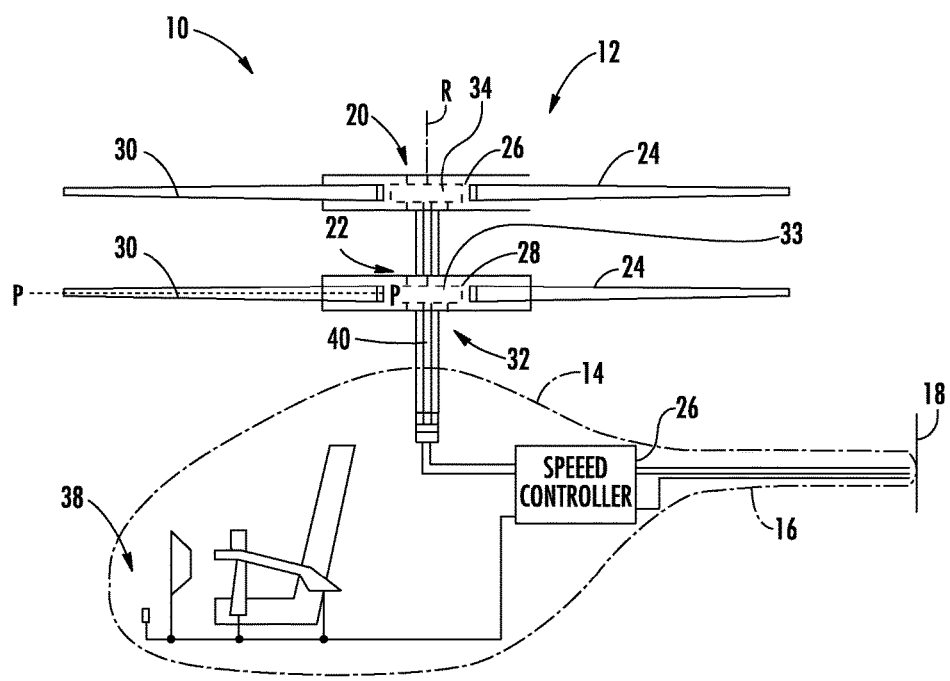
FIG. 1 is a schematic diagram of an example of a vertical takeoff and landing (VTOL) rotary wing aircraft.
Figure 2:
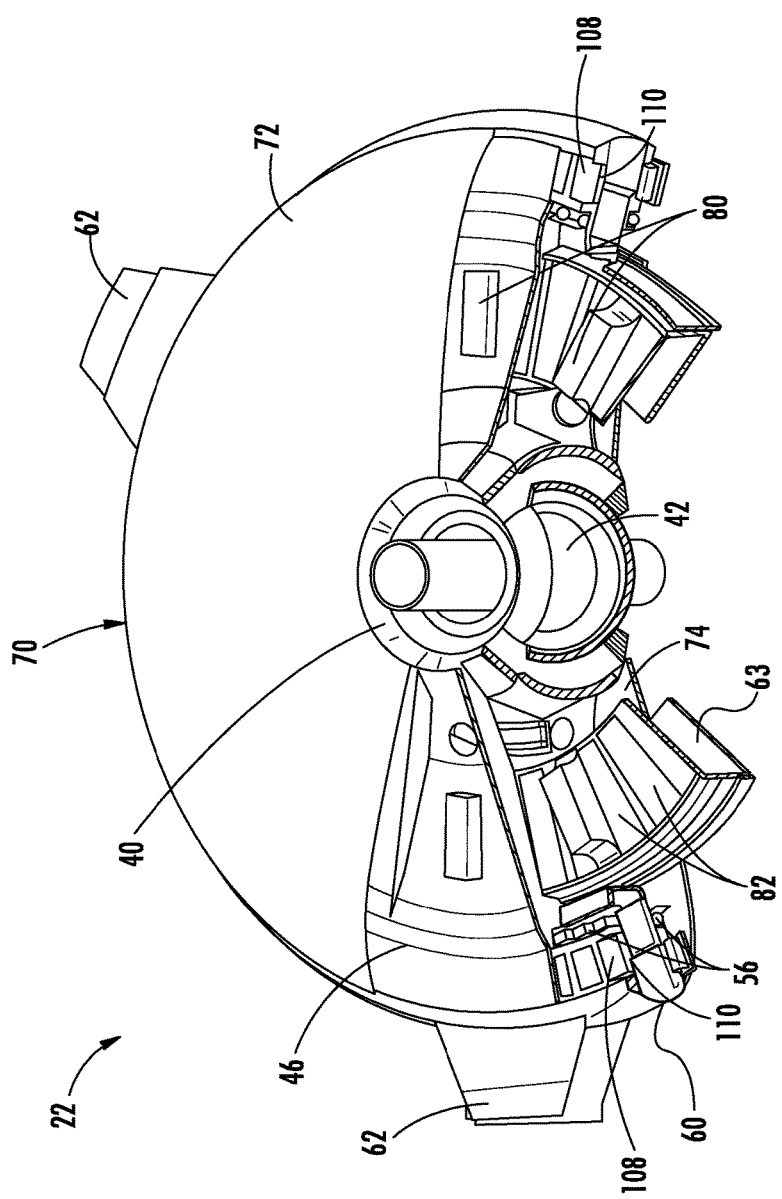
FIG. 2 is a perspective view of a propulsion system according to an embodiment.
Figure 3:
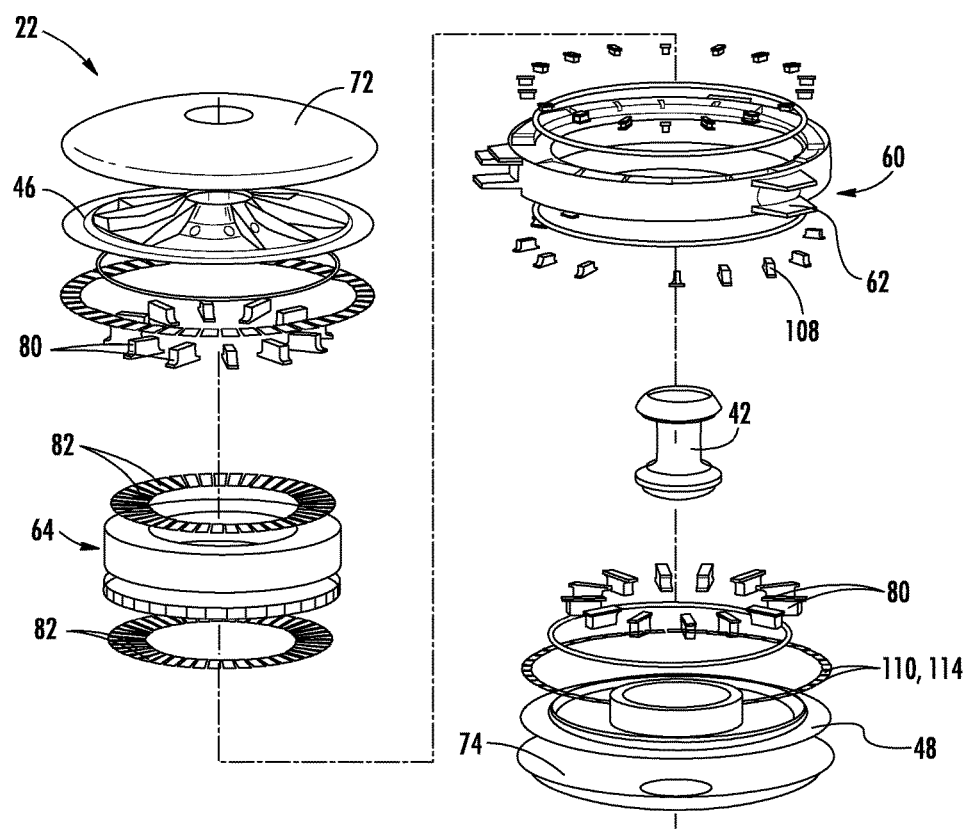
FIG. 3 is an exploded view of the propulsion system of FIG. 2 according to an embodiment.

FIG. 1 schematically illustrates an example of a vertical takeoff and landing (VTOL) rotary wing aircraft 10. The aircraft 10 in the non-limiting embodiment of FIG. 1 includes a dual, counter-rotating main rotor system 12, rotatable about an axis of rotation R, supported by an airframe 14 having an extending tail 16 which mounts a thrusting device system 18, such as an auxiliary propulsion system. The dual, counter-rotating, coaxial rotor system 12 includes an upper rotor system 20 and a lower rotor system 22. Each rotor system 20, 22 includes a plurality of rotor blade assemblies 24 mounted to a rotor hub assembly 26, 28 for rotation about the rotor axis of rotation R.

The plurality of main rotor blade assemblies 24 project substantially radially outward from the hub assemblies 26, 28. Any number of main rotor blade assemblies 24 may be used with the rotor system 12. Each rotor blade assembly 24 of the rotor system 12 includes a rotor blade 30 mounted to a corresponding hub assemblies 26, 28 in a manner to permit the rotor blade 30 to pitch about a pitch axis P. It should be understood that various blade attachments may be utilized with the aircraft 10. Although a particular helicopter configuration is schematically illustrated in the disclosed non-limiting embodiments, other configurations and/or machines, such as Unmanned Air Vehicles, high speed compound rotary wing aircraft with supplemental translational thrust systems, tilt-rotors and tilt-wing aircraft in either manned or unmanned configurations will also benefit here from.

At least one of the main rotor system 12 and the anti-torque system 18 is configured as an electric propulsion system 32 that generally integrates a direct drive electric motor 34 into the rotary-wing aircraft 10. The one or more electric motors 34 of the propulsion system 32 may be controlled by an electronic speed controller 36 over a wide range of speeds in response to a flight control system 38.

With reference now to FIGS. 2-8, an example of a propulsion system 32 for operating a rotor system of an aircraft 10, such as a main rotor system 12 for example, is illustrated in more detail. The propulsion system 32 includes a static mast 40 that is generally stationary relative to the airframe 14 of the aircraft 10. The static mast 40 defines, but does not rotate about the axis of rotation R. An elastomeric gimbal 42 is coupled to the static mast 40, for example between the static mast 40 and a stationary rotor hub assembly 44. The elastomeric gimbal 42 is mounted concentrically with the static mast 40, such as via one or more interlocking splines for example, and is configured to allow the rotor hub assembly 44, to pivot or articulate relative to the static mast 40. The gimbal 42 provides additional degrees of freedom of movement and allows for a semi-rigid in-plane design resulting in reduced flight loads, component size, and vehicle weight.

In an embodiment, the portion of the rotor hub assembly 44 directly abuts a corresponding surface of the gimbal 42 at a bearing interface surface 43. Alternatively, a movable mast 45 (see FIG. 5) may be positioned between the rotor hub assembly 44 and the gimbal 42. The movable mast 45 does not rotate about the axis of rotation R; however, the movable mast 45 may be able to pivot or articulate relative to the static mast 40 and the airframe 14 via the elastomeric bearing 42. One or more actuators (not shown) may be operable to move the mast 45 relative to the static mast 40.

Figure 4:
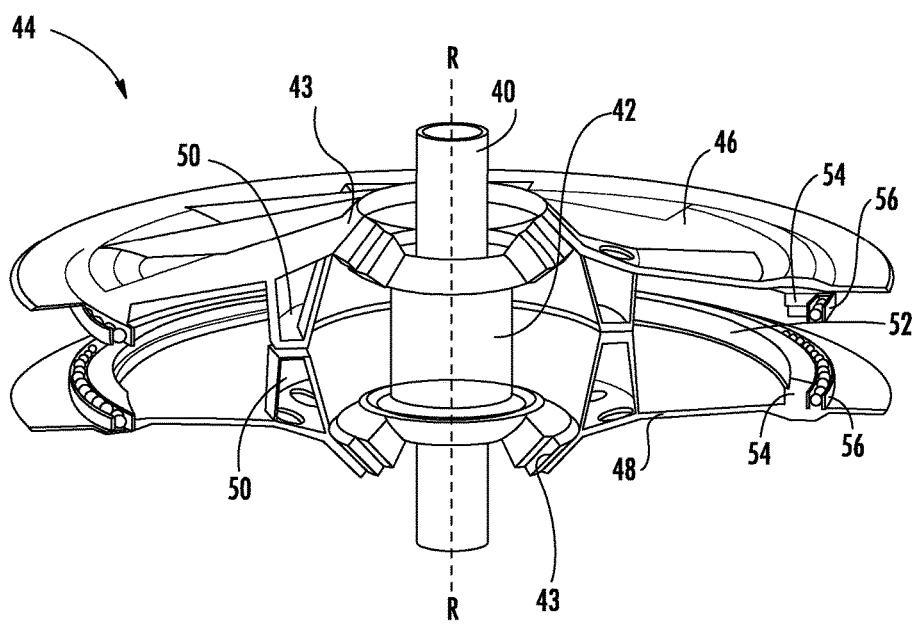
FIG. 4 is a perspective, partially cut away view of a stationary rotor hub assembly of the propulsion system according to an embodiment.
Figure 5:
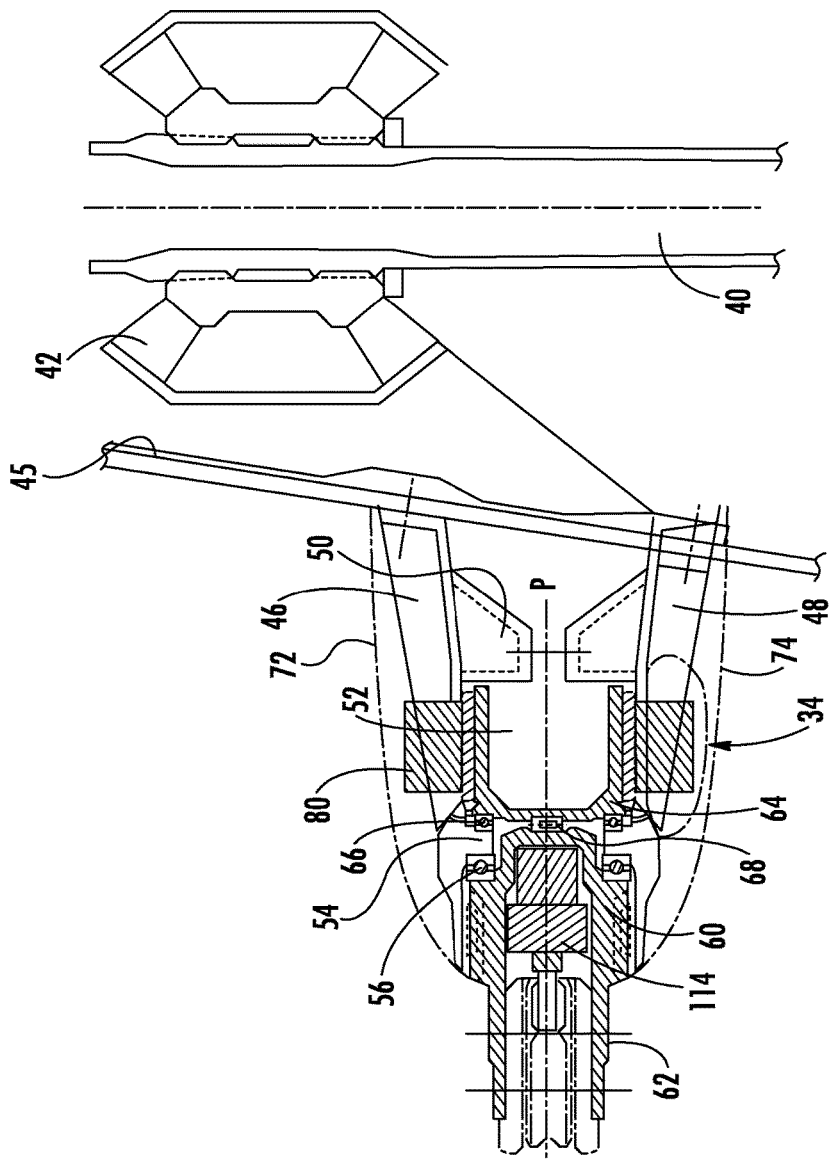
FIG. 5 is a cross-sectional view of a portion of the propulsion system of FIG. 2 according to an embodiment.
Figure 6:
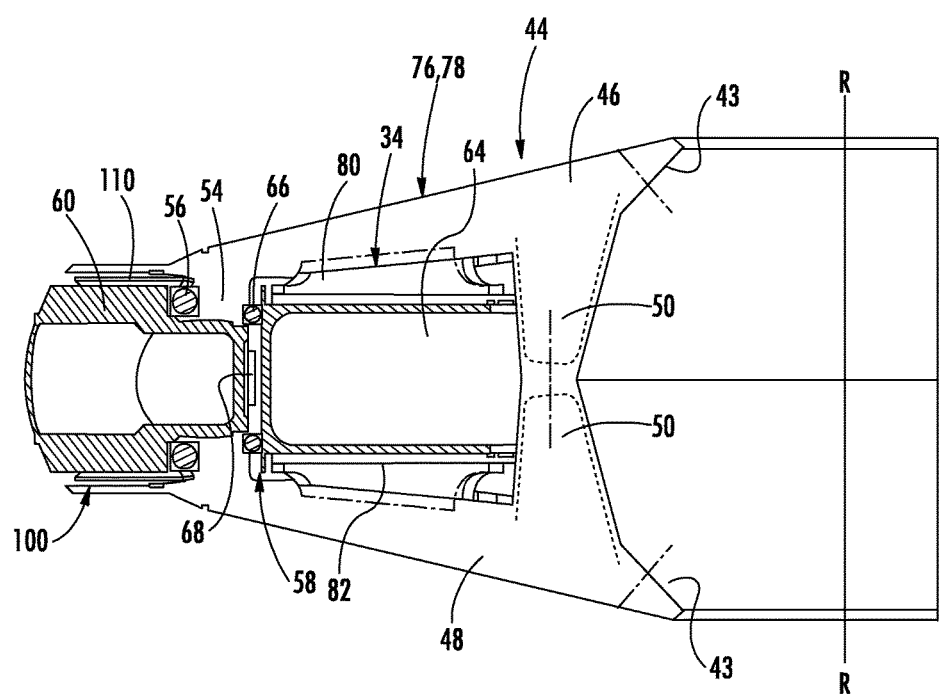
FIG. 6 is a cross-sectional view of the propulsion system according to an embodiment.
Figure 7:
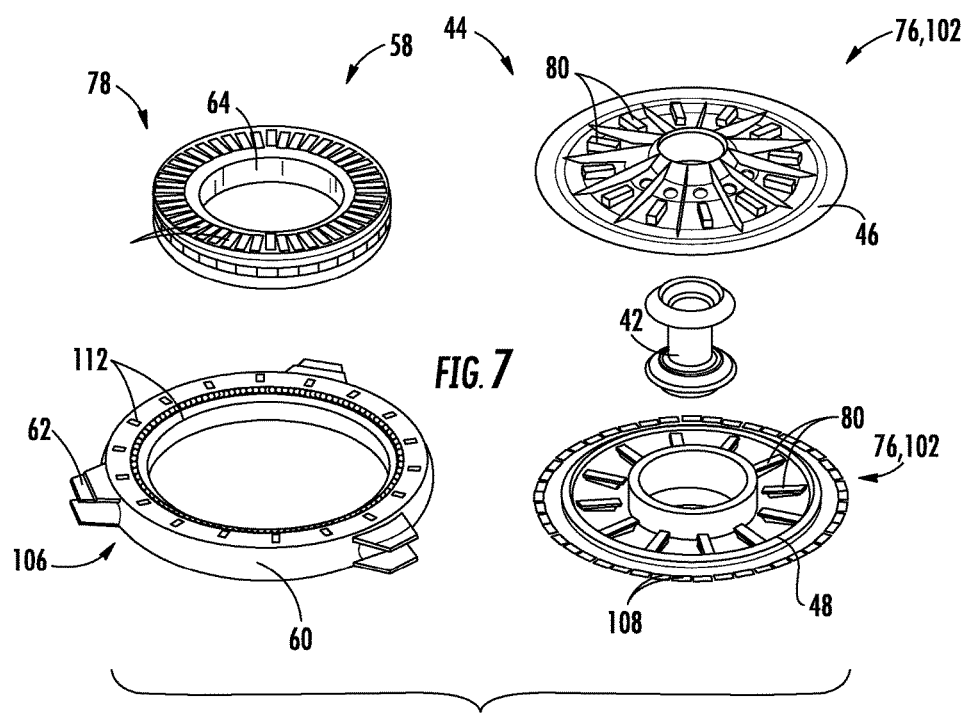
FIG. 7 is an exploded perspective view of various components that define the electric motor and power generation system of the propulsion system according to an embodiment.

With reference now to FIG. 4, in the illustrated, non-limiting embodiment, the stationary rotor hub assembly 44 includes a first, upper rotor hub portion 46 and a second, lower rotor hub portion 48. The second rotor hub portion 48 is complementary to the first rotor hub portion 46. In an embodiment, the first rotor hub portion 46 and the second rotor hub portion 48 are substantially identical and/or are symmetrical about a plane P. Within the rotor hub assembly 44, the first and second rotor hubs portion 46, 48 are rotated 180 degrees relative to one another such that the rotor hubs portion 46, 48 generally face one another. Although the first and second hub portions 46, 48 are illustrated and described as separate components, embodiments where the first and second rotor hub portions 46, 48 are integrally formed are also contemplated herein.

As shown in the FIGS., each of the first rotor hub portion 46 and the second rotor hub portion 48 includes a first rotor hub protrusion 50 extending perpendicularly from an inwardly facing surface of the rotor hub portion, 46, 48 towards the opposite rotor hub portion 46, 48. The protrusions 50 are generally sized such the distal end of the protrusion 50 of the first rotor hub portion 46 directly contacts the end of the protrusion 50 extending from the second rotor hub portion 48. As a result of this engagement between the first and second protrusions 50 and the configuration of the rotor hubs portions 46, 48, a gap or clearance 52 is formed between the first rotor hub portion 46 and the second rotor hub portion 48 outboard of the protrusions 50.

A second rotor hub protrusion 54 may extend from an inward facing surface of the rotor hubs portion 46, 48 at a location between the first protrusion 50 and the outer periphery of the rotor hub assembly 44. The second rotor hub protrusion 54 of each rotor hub portion 46, 48 is adapted to support a bearing 56 thereon. In an embodiment, the bearing 56 is a duplex bearing having a race aligned with each of the protrusions 54. As a result, the height of the protrusion 54 may be selected to be generally equal to or slightly larger than a height of the bearing 56.

The propulsion system 32 additionally includes a rotating system 58 rotatable relative to the stationary rotor hub assembly 44 about the axis R defined by the static mast 40. The rotating system 58 includes a rigid disk-shaped rotor head 60 mounted concentrically with the static mast 40. The rotor head 60 is configured to couple an inboard end of each rotor blade 30 to the static mast 40. As shown, a blade attachment cuff 62 configured to couple to a corresponding rotor blade 30 may be integrally formed with and extend generally outwardly from the outer periphery of the rotor head 60. However, embodiments where the rotating system 58 comprises a plurality of individual yokes spaced about the periphery of the static mast 40 and associated with the plurality of rotor blades 30 are also contemplated herein. As shown in the FIGS., the rotor head 60 is positioned generally adjacent the outboard end of the rotor hub assembly 44 between the first rotor hub portion 46 and the second rotor hub portion 48. The rotor head 60 is supported within the rotor hub assembly 44 by the at least one bearing 56 at a position adjacent the second protrusions 54.

The rotating system 58 of the propulsion system 32 additionally includes an over-running clutch 64. In an embodiment, the overrunning clutch 64 is generally positioned within the gap 52 formed between the first rotor hub portion 46 and the second rotor hub portion 48 between the first protrusion 50 and the second protrusion 54. One or more bearings 66, such as a duplex bearing set arranged adjacent a corresponding surface of the second protrusion 54, support the over-running clutch 64 within the rotor hub assembly 44. In an embodiment, the overrunning clutch 64 is mounted directly adjacent and in-line with a portion of the rotor head 60. As a result, a direct load path for torque transfer exists between the over-running clutch 64 and the rotor head 60. In the illustrated, non-limiting embodiment, the overrunning clutch 64 is a ramp-roller overrunning clutch including a plurality of rollers 68 mounted at an interface between the clutch 64 and the rotor head 60 about the periphery of the clutch 64. The surface of the rotor head 60 adjacent the clutch 64 may include one or more features (not shown) configured to cooperate with the clutch 64 to transmit rotation between the clutch 64 and the rotor head 60.

A fairing assembly 70 generally surrounds the exterior of the stationary rotor hub assembly 44 to provide structural support to the propulsion system 32 and to enhance the aerodynamic properties thereof, such as by reducing the drag thereof. The fairing assembly 70 may include a plurality of complementary portions, such as a first, upper fairing 72 and a second, lower fairing 74. In an embodiment, the upper and lower fairings 72, 74 are substantially identical and symmetrical about the plane P extending through the interface of the first protrusions 50 and normal to the axis of rotation R. The outboard ends of the upper and lower fairings 72, 74 are separated from one another to define a gap within which the rotating system 58 and the rotor blades 30 coupled thereto can rotate relative to the static mast 40.

The electric motor 34 configured to drive rotation of the plurality of rotor blades 30 about the axis R is integrated into the stationary rotor hub assembly 44 and the rotating system 58. The electric motor 34 includes a stator assembly 76 rigidly coupled to the static mast 40, and a rotor assembly 78 configured to rotate about the axis R, best shown in FIG. 7. The stator assembly 76 includes one or more electromagnetic coils 80 affixed to at least one surface of the rotor hub assembly 44. Wiring (not shown) associated with the at least one electromagnetic coil 80 may extend through a hollow interior of the static mast 40 and along a corresponding rotor hub portions 46, 48.

In the illustrated, non-limiting embodiment, electromagnetic coils 80 are affixed to both the first rotor hub portion 46 and the second rotor hub portion 48 to form a dual motor arrangement. However, embodiments where only one of the first and second rotor hub portions 46, 48 includes electromagnetic coils 80 are also contemplated herein. The total number of electromagnetic coils 80 included in the motor 34 may vary based on the desired performance of the propulsion system 32. The electromagnetic coils 80 are spaced circumferentially about the static mast 40 and are generally located at a position spaced radially outward from the static mast 40, such as in vertical alignment with the over-running clutch 64 for example.

In embodiments of the propulsion system 32 having a dual motor arrangement, the electromagnetic coils 80 mounted to the first rotor hub portion 46 and the second rotor hub portion 48 may be substantially identical, or alternatively, may be different. In addition, the one or more of the electromagnetic coils 80 mounted to the first rotor hub portion 46 may be vertically aligned with one or more electromagnetic coils 80 mounted to the second rotor hub portion 48. Alternatively, the one or more electromagnetic coils 80 mounted to the first rotor hub portion 46 may be staggered relative to the electromagnetic coils 74 mounted to the second rotor hub portion 48.

The rotor assembly 78 of the motor 34 includes one or more permanent magnets 82 mounted to the rotating system 58, and more specifically, to the over-running clutch 64. As shown, the magnets 82 are mounted to the over-running clutch 64 horizontally and are positioned such that the one or more magnets 82 are vertically aligned with the at least one electromagnetic coil 80 of the stator assembly 76. The spatial positioning between the electromagnetic coils 80 of the stator assembly 76 and the adjacent permanent magnets 82 of the rotor assembly 78 is defined by the clearance 52 between the upper and lower rotor hub portions 46, 48 and the bearings 56, 66 positioned therein. In an embodiment, the magnets 82 are fixedly or removably mounted to at least one of an upper surface and a lower surface of the over-running clutch 64. The magnets 82 are generally circumferentially positioned about the over-running clutch 64, concentric with the static mast 40. The magnets 82 may, but need not be, equidistantly spaced about the over-running clutch 64.

Figure 8:
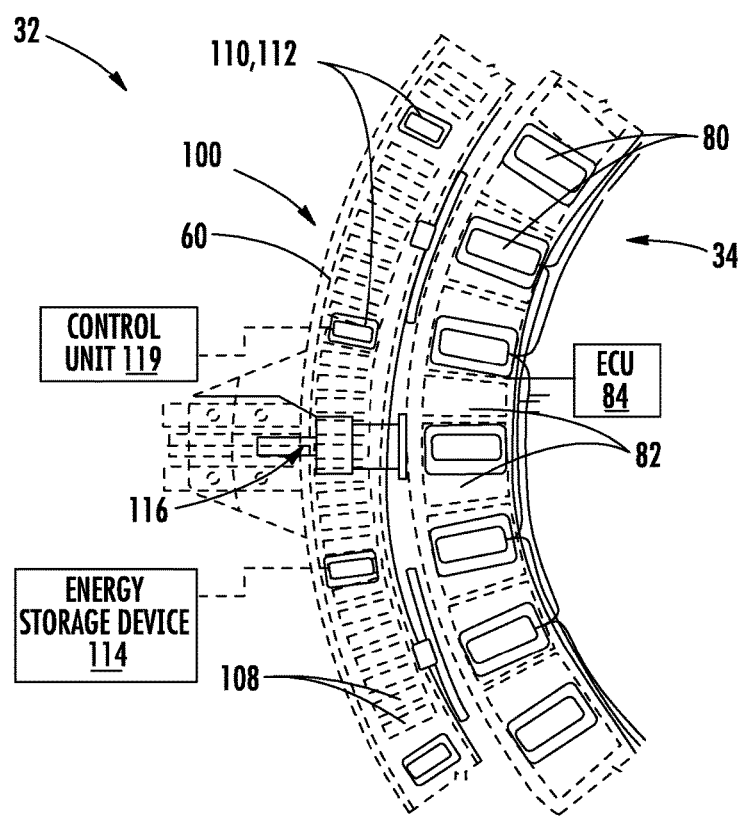
FIG. 8 is a top view of a portion of the propulsion system of FIG. 2 according to an embodiment.

The rotor assembly 78 is configured to rotate with respect to the stator assembly 76 and the static mast 40 as the magnets 82 of the rotor assembly 78 react with an induced magnetic field generated when the electromagnetic coils 80 of the stator assembly 76 are energized. As the over-running clutch 64 rotates about the axis R defined by the static mast 40, an energizing spring force pinches the rollers 68 between the rotor head 60 and the clutch 64. As a result of this engagement, torque is transferred from the clutch 64 to the rotor head 60. During operation, all electrical inputs necessary to power the motor 34 resides in the fixed frame of references, thereby eliminating the need for stationary to rotating power transfer couplings, such as slip rings. The motor electronic control unit (ECU), illustrated schematically at 84 in FIG. 8, is also located in the fixed frame and is operable to control application of electrical energy and signal to the stationary coils, thereby providing torque and speed control.

In an embodiment, the propulsion system 32 additionally includes a power generation system 100, such as a generator or any other suitable system for collecting power during operation of the aircraft 10 for example. As shown, the power generation system 100 includes a generator stator 102 and a generator rotor 106. In the illustrated, non-limiting embodiment, the generator stator 102 is integrally formed with the rotor hub assembly 44 and includes a plurality of permanent magnets 108 and a plurality of induction type magnets 110 affixed to at least one surface thereof. As shown, the plurality of magnets 108, 110 are located adjacent an outboard edge of at least one of the upper rotor hub portion 46 and the lower rotor hub portion 48. In the illustrated, non-limiting embodiment, the total number of induction type magnets is substantially less than the total number of permanent magnets 108. For example, the ratio of permanent magnets 108 to induction type magnets 110 of the generator stator may be 5. However, a generator stator 102 including any suitable number of induction type magnets 110 is contemplated herein. The generator rotor 106 additionally includes one or more induction type magnets 112 mounted to the rotor head 60. In the illustrated, non-limiting embodiment, the induction type magnets 112 are mounted to one or more surfaces of the rotor head 60 in generally vertical alignment with the plurality of permanent magnets 108 and the plurality of induction type magnets 110. As used herein, the term "induction type magnets" is intended to include electromagnetic coils or any other suitable magnet configured to receive a supply of electricity to generate a magnetic field.

During normal operation of the aircraft 10, the electric motor 34 drives rotation of the rotating system 58 relative to the stationary rotor hub assembly 44. As the motor rotor and the rotor head 60 coupled to the motor rotor via the clutch rotate about the rotational axis R, the magnetic fields of the permanent magnets 108 mounted to the stationary hub assembly 44 induce an electrical current in the induction type magnets 112 mounted to rotor head 60. Accordingly, in this mode of operation, no electricity is supplied to the induction type magnets 110, 112 of either the generator stator 102 or the generator rotor 106.

The current induced in the induction type magnets 112 mounted to the rotor head 60 may be provided to an energy storage device 114, such as a battery for example. In an embodiment, the energy storage device 114 is mounted to the rotating system 58 of the propulsion system 32. Alternatively, or in addition, the power created by the power generation system 100 may be used to power one or more components located within the rotating frame of the propulsion system 32, such as an electromechanical actuator 116 configured to control rotation of a corresponding rotor blade 30 about a pitch axis P. In such embodiments, the electromechanical actuator 116 is self-contained within the rotor head 60, and a wireless system is used for lower power transfer and for communication between the power generation system and/or the energy storage device 114 with the electromechanical actuator 116.

During operation of the aircraft 10 in autorotation, the electric motor 34 does not drive rotation of the rotor head 60 about the rotational axis R. Rather, the rotor head 60 is aerodynamically back driven about the axis of rotation R by the upward forces acting on the rotor blades 30. As previously described, operation of the differential collective to provide yaw control of the aircraft 10 during autorotation is typically limited. In an embodiment, the power generation system 100 is operable to provide directional control of the aircraft 10 during autorotation. The power generation system 100 may be used in a manner similar to a regenerative braking system to control the torque of the rotor head 60. The interaction between the permanent magnets 108 of the generator stator 102 and the induction type magnets 112 of the generator rotor 106 results in a default torque acting on the rotor head 60. To change the torque of the rotor head from this default torque, power, such as from the energy storage device 114 for example, is selectively provided to the induction type magnets 110, 112 of one or both the generator stator 102 and the generator rotor 106. By modulating the magnitude of the current provided to one or both of the induction type magnets 110, 112, or the resulting magnetic flux, the torque of the rotor head 60 can be controlled to achieve a torque that is different than the default torque. This modulation may be used to either increase or decrease the torque relative to default torque.

Through the application of power to either the induction type magnets 110 of the generator stator 102 and/or the induction type magnets 112 of the generator rotor 106, the rotation of the rotor head 60 can be controlled without decreasing the rotational speed of the rotor head 60. In embodiments where the aircraft 10 has a dual, contra-rotating coaxial main rotor system 12, and at least one rotor hub assembly 20, 22 includes a propulsion system 32 as described herein, the power generating system 100 of the propulsion system 32 may be used to control the rotational torque of the rotor blades 30 of a corresponding rotor system to provide an imbalance in the torque between the first rotor system 20 and the second rotor system 22. This imbalance may be controlled to provide a form of yaw control during autorotation, thereby allowing the aircraft to turn.

In an embodiment, the power generation system 100 additionally includes a control unit 119, such as a full authority digital electronic control (FADEC) arranged in communication with a flight control computer of the aircraft 10 and with the battery 114. The control unit 119 is operable to control application of electrical energy and signal to the induction-type magnets 110, 112, thereby providing torque and speed control to the rotor head 60. The control unit 119 is operable in autorotation, and in some embodiments, may additionally be operable during powered flight of the aircraft 10. Upon detection that the aircraft 10 is operating in autorotation, the control unit 119 will apply electrical energy to the induction type magnets 110, 112, such as in response to one or more commands provided by a pilot, the FCC, or any other suitable source.

Figure 9:
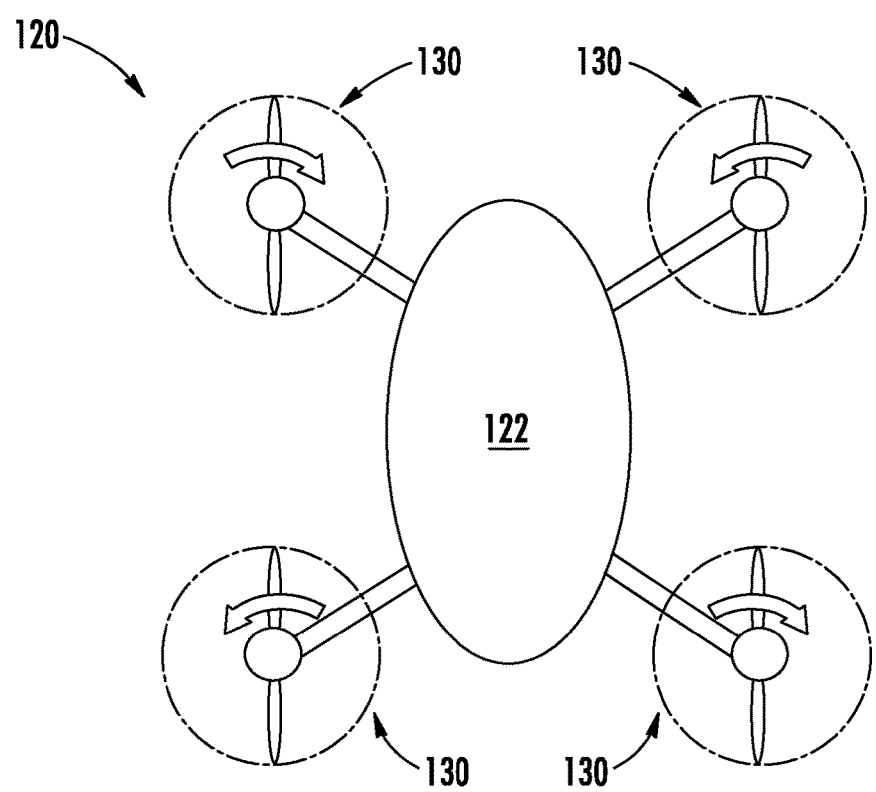
FIG. 9 is a plan view of a distributed propulsion vehicle according to an embodiment.

With reference now to FIG. 9, an example of a distributed propulsion vehicle 120 is illustrated. As shown, the vehicle 120 includes a body 122 and has a plurality of propulsion units or rotor systems 130 arranged about the vehicle 120. The propulsion units 130 in a distributed propulsion vehicle 120, such as an aircraft for example, are typically greater in number and smaller in size than in a conventional aircraft. Although the illustrated, non-limiting embodiment of a distributed propulsion vehicle 120 is a quadcopter having four separate propulsions units 130, a distributed propulsion vehicle 120 having any number of propulsion units 130, such as a hexcopter, tilt-wing, and volocopter for example are also within the scope of the disclosure.

Figure 10:
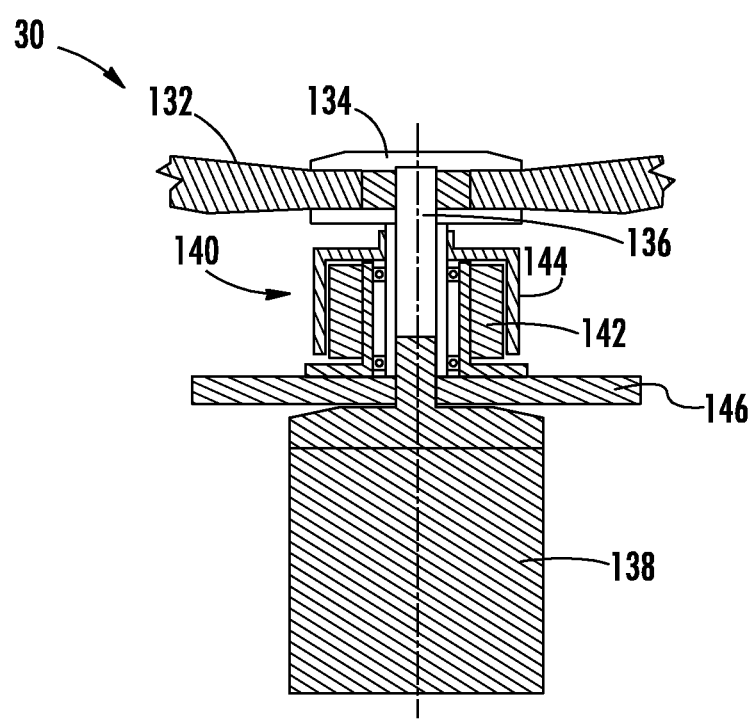
FIG. 10 is a cross-sectional view of a rotor system of a distributed propulsion vehicle according to an embodiment.
Figure 11:
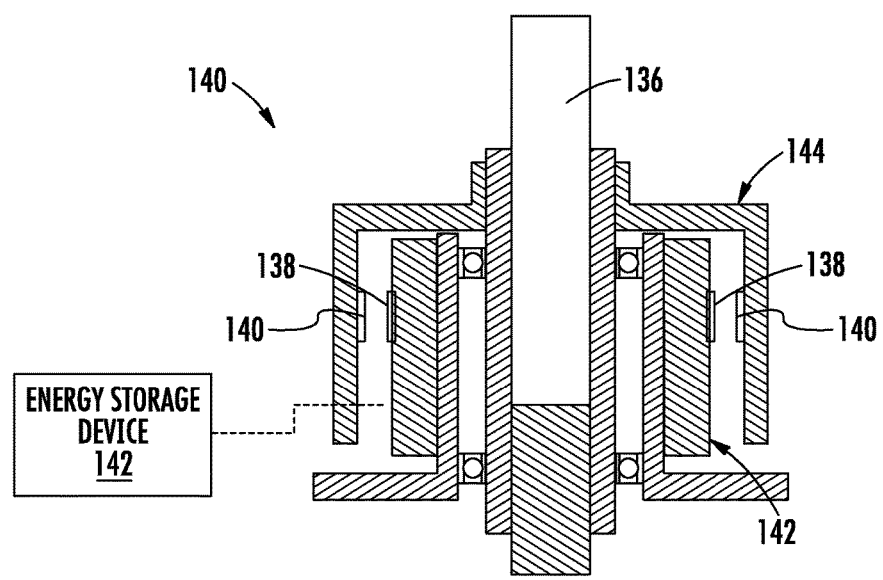
FIG. 11 is a detailed cross-sectional view of a generator of the rotor system of FIG. 10 according to an embodiment.

With reference now to FIGS. 10-11, an example of a rotor system 130 for use in a distributed propulsion vehicle 120 is illustrated. As shown in the FIGS., each rotor system 130 includes a plurality of propeller blades 132 extending outwardly from a propeller hub 134. A shaft 136 coupled to the propeller hub 134 is operable to drive the propeller hub 134, and therefore the plurality of propeller blades 132 about an axis of rotation X. Rotation of the propeller shaft 136 may be driven by a power source 138 including gas powered engine, or alternatively, an electric motor, as shown in the FIGS.

In an embodiment, a power generation system or generator 140 is associated with one or more of the rotor systems 130 of the distributed propulsion vehicle. This generator system 140 consists of induction type magnets and has the ability to turn on or off as required. The generator 140 includes a generator stator 142 and a generator rotor 144 disposed concentrically with the propeller shaft 136. In the illustrated, non-limiting embodiment, the generator stator 142 is affixed to a mounting plate 146 located between the generator 140 and the power source 138 configured to drive the propeller shaft 136 about its axis of rotation X. In other embodiments, the generator stator 142 may be affixed to the airframe or another stationary component of the vehicle. The generator rotor 144 is coupled to the shaft 136 and is configured to rotate with the shaft 136 about the stator 142. The generator stator 142 includes at least one first electromagnet 148, and the generator rotor 144 includes at least one electromagnet 150, such as an electromagnetic coil for example. During normal operation of the distributed propulsion vehicle, the power source 138 drives rotation of the propeller shaft 136, and therefore the generator rotor 144, about the axis of rotation X. As the rotor 144 rotates about the generator stator 142, a torque is produced by the drive motor 138. In operation, the induced current may be collected or used to charge an energy storage device 152 coupled to the stator 142.

The rotors 130 of the distributed propulsion vehicle 120 are typically grouped in pairs such that the torque of a first rotor system 130 is balanced with a second rotor system 130 disposed at another location about the vehicle 120. Because the propeller blades 132 of a rotor system 130 of a distributed propulsion vehicles 120 are typically unable to rotate about a pitch axis, conventionally a yawing moment is achieved by increasing the rotational speed of a first rotor system 130, such as by applying additional torque for example, while simultaneously decreasing the rotational speed of the second rotor system 130 of the pair, for example by applying a brake thereto, to balance the lift forces between the first and second rotor systems 130. While this process has been successful on simple multi-rotor vehicle 120s, as size and weight increase or the number of rotor systems 130 increase and complicate the symmetry of lift of the vehicle, the potential for undesirable control couplings exists.

Inclusion of the power generation system 140 is intended to remedy the potential for undesirable control couplings due to differential thrust. This type of power generation system 140 can be selectively turned on and off to provide pure torsional reactions to a corresponding rotor system 130 instantaneously without creating control couplings associated with propeller geometric position. To apply yaw control, an electrical current may be supplied to at least one of the induction type-coils coupled to the generator stator 144 and the generator rotor 144, to control a torque of the rotor system 130. The torque adjustment may be applied to only one of the rotor systems 130 within the pair, resulting in a difference that causes the vehicle 120 to yaw accordingly.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A rotor system of an aircraft comprising:
   a rotor hub rotatable about an axis of rotation;
   a power generation system including:
      a generator stator and a generator rotor, the generator rotor being coupled to the rotor hub;
      at least one induction type magnet mounted to at least one of the generator stator and the generator rotor; and
      a control unit operably coupled to at least one induction type magnet to selectively deliver power to the at least one induction type magnet to alter a torque of the rotor hub without decreasing a rotational speed of the rotor hub.

2. The rotor system of claim 1, wherein the power generation system is driven by the rotor hub in a first mode of operation and the rotor hub is driven at least partly by the power generation system in a second mode of operation.

3. The rotor system of claim 2, wherein the power generation system further comprises an energy storage device operably coupled to the at least one induction type magnet, and in the first mode, power is stored within the energy storage device.

4. The rotor system of claim 2, wherein in the first mode, power is not provided to the at least one induction type magnet.

5. The rotor system of claim 2, wherein in the second mode of operation, the control unit selectively delivers power from the energy storage device to the at least one induction type magnet to control the torque of the rotor hub.

6. The rotor system of claim 2, wherein in the second mode of operation, the aircraft is in autorotation.

7. The rotor system of claim 1, wherein control of the torque of the rotor hub provides yaw control to the aircraft.

8. The rotor system of claim 1, wherein the rotor system is one of a plurality of rotor systems of the aircraft.

9. The rotor system of claim 8, wherein the rotor system is one of an upper rotor system and a lower rotor system of a coaxial main rotor system.

10. The rotor system of claim 8, wherein the aircraft is a distributed propulsion aircraft.

11. The rotor system of claim 1, wherein the power generation system is disposed adjacent an outboard end of the rotor hub.

12. The method of claim 11, wherein the rotor system is one of a plurality of rotor systems of the aircraft.

13. The method of claim 12, wherein the rotor system is one of an upper rotor system and a lower rotor system of a coaxial main rotor system.

14. The method of claim 12, wherein the aircraft is a distributed propulsion aircraft.

15. A method of operating an aircraft comprising:
   rotating a rotor system of the aircraft about an axis of rotation;
   applying power, via a control unit, to at least one induction type magnet of a power generation system coupled to the rotor system; and
   adjusting a torque of the rotor hub without decreasing a rotational speed of the rotor hub.

16. The method of claim 15, wherein adjusting the torque of the rotor hub provides directional control to the aircraft.

17. The method of claim 16, wherein the directional control includes yaw control.

18. The method of claim 15, wherein applying power through the control unit to at least one induction type magnet further comprises modulating the power applied to the at least one induction type magnet.

19. The method of claim 15, wherein adjusting the torque of the rotor hub comprises increasing the torque of the rotor hub.

20. The method of claim 15, wherein adjusting the torque of the rotor hub comprises decreasing the torque of the rotor hub.

<p style="text-align:center">* * * * *</p>